(12) United States Patent
Mukai

(10) Patent No.: US 6,925,220 B2
(45) Date of Patent: Aug. 2, 2005

(54) OPTICAL SWITCH USING MULTIMODE INTERFEROMETER, AND OPTICAL DEMULTIPLEXER

(75) Inventor: Kohki Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 10/755,446

(22) Filed: Jan. 13, 2004

(65) Prior Publication Data

US 2004/0141750 A1 Jul. 22, 2004

Related U.S. Application Data

(62) Division of application No. 10/092,551, filed on Mar. 8, 2002, now Pat. No. 6,771,847.

(30) Foreign Application Priority Data

Oct. 15, 2001 (JP) ........................................ 2001-316546

(51) Int. Cl.[7] ............................ G02B 6/26; H04J 14/00; H04J 14/08
(52) U.S. Cl. .............................. 385/16; 398/52; 398/53; 398/98; 398/102
(58) Field of Search .............................. 398/52, 53, 98, 398/102; 385/16, 45, 4

(56) References Cited

U.S. PATENT DOCUMENTS

| | | | | |
|---|---|---|---|---|
| 5,703,708 A | * | 12/1997 | Das et al. | 398/102 |
| 6,263,126 B1 | * | 7/2001 | Cao | 385/24 |
| 2002/0101293 A1 | | 8/2002 | Shibata et al. | 322/112 |
| 2003/0002117 A1 | | 1/2003 | Naik et al. | 359/179 |
| 2003/0002797 A1 | | 1/2003 | Chu et al. | 385/39 |

* cited by examiner

*Primary Examiner*—John D. Lee
*Assistant Examiner*—James D. Stein
(74) *Attorney, Agent, or Firm*—Westerman, Hattori, Daniels & Adrian, LLP

(57) ABSTRACT

A first multimode interferometer has a first input port to which an optical signal is applied, a first output port, and a second output port. A first optical waveguide is connected to the first output port of the first multimode interferometer. The first optical waveguide has a refractive index changed in response to a trigger signal externally applied. A second optical waveguide is connected to the second output port. A triggering unit supplies, to the first optical waveguide, the trigger signal for changing the refractive index of the first optical waveguide. An optical switch is provided which can increase the processing speed, can reduce the device size, and is free from dependency on the polarization state of an optical signal.

10 Claims, 15 Drawing Sheets

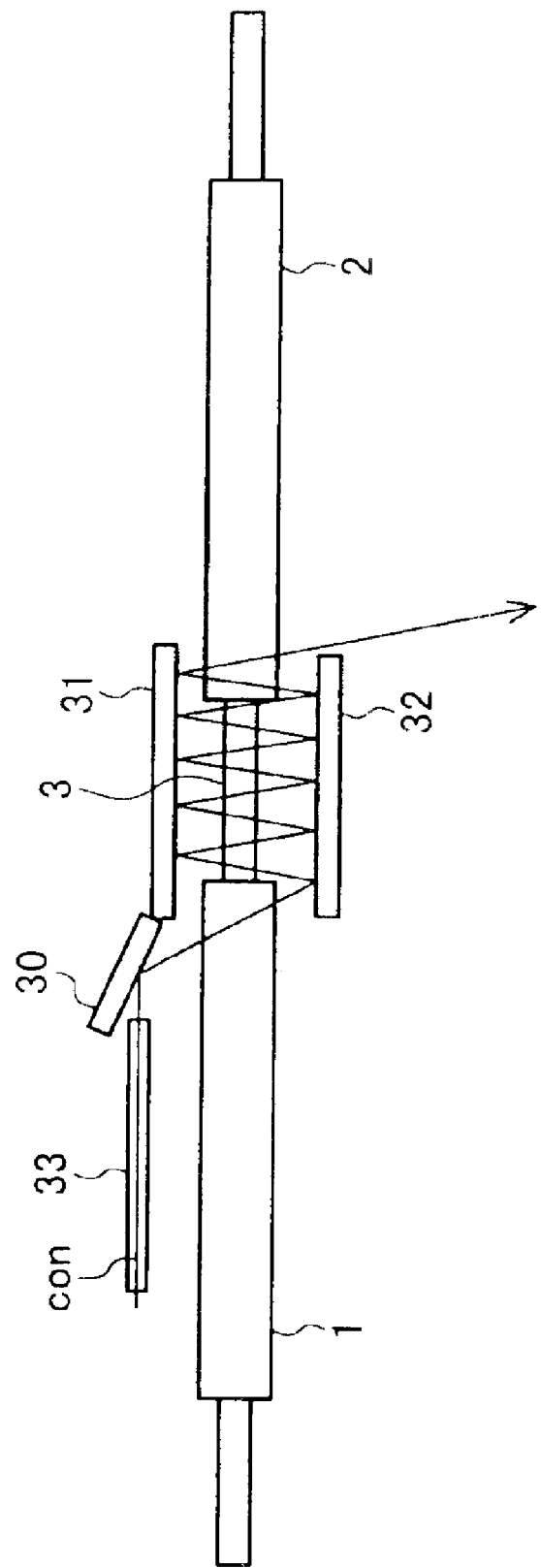

OPTICAL SWITCH USING MULTIMODE INTERFEROMETER, AND OPTICAL DEMULTIPLEXER

CROSS REFERENCE TO RELATED APPLICATION

This application is a Division of Ser. No. 10/092,551 filed Mar. 8, 2002 now U.S. Pat. No. 6,771,847.

This invention is based on and claims priority of Japanese patent application 2001-316546, filed on Oct. 15, 2001, the whole contents of which are incorporated herein by reference.

BACKGROUND OF THE INVENTION

1. Field of the Invention

The present invention relates to an optical switch and an optical demultiplexer, and more particularly to an optical switch and an optical demultiplexer which are simplified in structure and control.

2. Description of the Related Art

Recently, a wavelength division multiplexing (WDM) optical communication system has been developed as a broadband optical communication system. Other optical communication systems, such as optical time division multiplexing (OTDM) and time wavelength division multiplexing (TWDM), have also been proposed and studied aiming at broader band optical communication.

The WDM optical communication system is a system for increasing signal density through wavelength multiplexing of an optical signal. The time division systems, such as OTDM and TWDM optical communication systems, are intended to increase signal density by time-dividing an optical signal of the same wavelength and assigning divided optical signals to a number of channels.

Response speed of an electrical signal is limited by a moving time of carriers in a semiconductor device and hence lower than the response speed of an optical signal. At present, the speed limit of an electrical signal is thought to be about 40 Gbits/s. To process an OTDM signal having speed higher than that limit, an optical signal must be divided through high-speed optical signal processing and demultiplexed to a bit rate, at which electrical processing is feasible.

In view of the above-mentioned background, an optical device (optical demultiplexer) has recently been studied which is able to demultiplex an optical signal, as it is, without converting the optical signal into an electrical signal. Hitherto, optical demultiplexers of, e.g., non-linear optical loop mirror (NOLM) type, Mach-Zehnder type and polarization separating type, have been proposed.

FIG. 15A is a schematic view of a NOLM type optical demultiplexer. An optical signal $sig_1$ reaches a branch point 102 of an optical fiber loop 101 via an input side optical fiber 100. At the branch point 102, the optical signal $sig_1$ is branched into an optical signal $sig_2$ propagating in the loop 101 counterclockwise and an optical signal $sig_3$ propagating in the loop 101 clockwise. The optical signal $sig_1$ is a signal having four time-division multiplexed channels, i.e., channels #1 to #4.

A non-linear waveguide 103 is inserted in the optical loop 101 at a position asymmetrical to the branch point 102. The optical signal $sig_2$ propagating counterclockwise reaches the non-linear waveguide 103 at timing earlier than the optical signal $sig_3$ propagating clockwise. A control light pulse con is inputted to the non-linear waveguide 103 immediately after the channel #2 of the optical signal $sig_2$ has passed the non-linear waveguide 103. The refractive index of the non-linear waveguide 103 is changed upon the inputting of the control light pulse con, whereby the phase of a pulse light in each channel #3 and #4 of the optical signal $sig_2$ is shifted π. In FIG. 15A, a pulse having phase shifted π is represented by hatching.

Because the optical signal $sig_3$ reaches the non-linear waveguide 103 at timing delayed from the optical signal $sig_2$, only the channel #1 of the optical signal $sig_3$ has passed the non-linear waveguide 103 at the time when the control light pulse con is inputted to the non-linear waveguide 103. Therefore, the phase of a pulse light in each of the channels #2 to #4 of the optical signal $sig_3$ is shifted π.

When the optical signals $sig_2$ and $sig_3$ return to the branch point 102, the pulses in those ones #1, #3 and #4 of the channels of both the signals, which are in phase, propagate in the input side optical fiber 100, and the pulse in the out-of-phase channel #2 propagates in an output side optical fiber 105. Thus, only the signal of one channel can be separated from the time division multiplexed signal $sig_1$.

In the NOLM type optical demultiplexer, the time required for the optical signal to pass the optical loop 101 limits the signal speed achievable in signal processing. Also, the use of an optical fiber loop raises a difficulty in reducing the device size.

FIG. 15B is a schematic view of a Mach-Zehnder type optical demultiplexer. Non-linear waveguides 121 and 122 are inserted respectively in two arms of a Mach-Zehnder interferometer 120. An optical signal $sig_{10}$ is branched into two optical signals $sig_{11}$ and $sig_{12}$, which are introduced to the non-linear waveguides 121 and 122, respectively. A control light pulse con is inputted to the non-linear waveguides 121 and 122 at different timings from each other.

The control light pulse con is inputted to the non-linear waveguide 121 immediately after a pulse in a channel #1 has passed the non-linear waveguide 121, and is inputted to the non-linear waveguide 122 immediately after a pulse in a channel #2 has passed the non-linear waveguide 122. Therefore, the phase of an optical pulse in each of the channels #2 to #4 of the optical signal $sig_{11}$ is shifted π after passing the non-linear waveguide 121, and the phase of an optical pulse in each channel #3 and #4 of the optical signal $sig_{12}$ is shifted π after passing the non-linear waveguide 122.

When the optical signals $sig_{11}$ and $sig_{12}$ are combined with each other, the signals in the channels #1, #3 and #4 are introduced to one output optical fiber 125, and the signal in the channel #2 is introduced to the other output optical fiber 126.

Thus, in the Mach-Zehnder type optical demultiplexer, two arms, in which non-linear waveguides are respectively inserted, must be arranged parallel to each other. The device size is therefore increased.

FIG. 15C is a schematic view of a polarization separating type optical demultiplexer. An optical signal $sig_{20}$ enters a birefringence crystal 130. The birefringence crystal 130 delays a light in the TM mode by one pulse relative to a light in the TE mode. An optical signal $sig_{21}$ having passed the birefringence crystal 130 and a control light pulse con are both inputted to a non-linear waveguide 131. The control light pulse con is inputted to the non-linear waveguide 131 immediately after a TE-mode pulse in the channel #2 has passed the non-linear waveguide 131.

In an optical signal $sig_{22}$ having passed the non-linear waveguide 131, therefore, the phase of the TE-mode optical pulse in each channel #3 and #4 is shifted π, and the phase of the TM-mode optical pulse in each of the channels #2 to #4 is shifted π. The optical signal $sig_{22}$ having passed the non-linear waveguide 131 is inputted to another birefringence crystal 132. The birefringence crystal 132 delays a light in the TE mode by one pulse relative to a light in the TM mode. Accordingly, in an optical signal $sig_{23}$ having passed the birefringence crystal 132, positions of the TM-mode pulses match respectively with positions of the TE-mode pulses in the corresponding channels.

In the optical signal $Sig_{23}$, therefore, the TM-mode pulses and the TE-mode pulses are in phase in the channels #1, #3 and #4, but they have a phase difference therebetween in the channel #2. By introducing the optical signal $sig_{23}$ to enter a polarizer 133, only the pulse of the channel #2 can be separated.

Thus, the polarization separating type optical demultiplexer is designed on condition that an inputted optical signal has intensities substantially equal to each other between the TM and TE modes. In general, however, the polarization state of an optical signal having propagated through an optical fiber is not constant. For that reason, the polarization separating type optical demultiplexer is not suitable for practical use.

As described above, the various types of conventional optical demultiplexers have problems such as a limitation in processing speed, an increased device size, and dependency on the polarization state of an optical signal.

SUMMARY OF THE INVENTION

It is an object of the present invention to provide an optical switch, which can increase the processing speed, can reduce the device size, and is free from dependency on the polarization state of an optical signal.

Another object of the present invention is to provide an optical demultiplexer using the optical switch.

According to one aspect of the present invention, there is provided an optical switch comprising: a first multimode interferometer having a first input port to which an optical signal is applied, and at least two output ports; a first optical waveguide connected to one or each of plural first output ports, which is or are selected from the output ports, and allowing a light exiting from the one or plural first output ports to propagate therethrough, the first optical waveguide having a refractive index changed in response to a trigger signal externally applied; a second optical waveguide connected to one or each of plural second output ports, which is or are selected from the output ports, and allowing a light exiting from the one or plural second output ports to propagate therethrough; and trigger for supplying, to the first optical waveguide, the trigger signal for changing the refractive index of the first optical waveguide.

According to another aspect of the present invention, there is provided an optical switch further comprising a second multimode interferometer having at least two input ports and a first output port, the input ports being connected respectively to an output end of said first optical waveguide and an output end of said second optical waveguide.

According to still another aspect of the present invention, there is provided an optical demultiplexer comprising: a plurality of drop devices, each of the drop devices having a control light input port to which a control light is applied, an optical signal input port to which an optical signal is applied, and a drop signal output port from which the optical signal is delivered in synchronous with inputting of the control light; a signal waveguide for branching a time-division multiplexed optical signal and introducing a plurality of branched optical signals respectively to the optical signal input ports of the drop devices; and a control waveguide for branching one control light and introducing a plurality of branched control lights to reach the corresponding drop devices at delays gradually shifted in units of a certain time.

According to still another aspect of the present invention, there is provided an optical demultiplexer comprising: a number N (N is two or larger integer) of drop devices, each of the drop devices having a control light input port to which a control light is applied, an optical signal input port to which an optical signal is applied, and a drop signal output port from which the optical signal is delivered in synchronous with inputting of the control light; a signal waveguide for introducing an optical signal, which is time-division multiplexed at multiplicity of N and has a number N of channels, to the optical signal input port of each of the drop devices; and a control waveguide for branching one control light into a number N of control lights and introducing an i-th (i is an integer not smaller than 1 but not larger than N) one of the branched control lights to the control light input port of an i-th drop device, the signal waveguide and the control waveguide delaying one of the control light and the optical signal relative to the other such that the control light applied to the i-th drop device is in synchronous with an i-th channel of the optical signal applied to the i-th drop device.

According to still another aspect of the present invention, there is provided an optical demultiplexer comprising: a number N (N is two or larger integer) of drop devices arranged from a first stage to an N-th stage, each of the drop devices having a control light input port to which a control light is applied, an optical signal input port to which an optical signal is applied, a drop signal output port from which the optical signal is delivered in synchronous with inputting of the control light, and a through signal output port from which the optical signal is delivered at least during a period in which the optical signal is not delivered from the drop signal output port; a first signal waveguide for introducing a time-division multiplexed optical signal to the optical signal input port of the first-stage drop device; a second signal waveguide for connecting the through signal output port of each drop device to the optical signal input port of the drop device in a next stage; and a control waveguide for branching one control light and introducing a plurality of branched control lights to reach the corresponding drop devices at delays gradually shifted in units of a certain time toward a most downstream stage.

With the features set forth above, an optical switch and an optical demultiplexer, each having a reduced size, can be realized by combining a multimode interferometer and a non-linear waveguide with each other.

BRIEF DESCRIPTION OF THE DRAWINGS

FIG. 8 is a schematic view showing an optical system for introducing excitation light to the non-linear waveguide, which is used in the optical switch according to the embodiment;

DETAILED DESCRIPTION OF THE PREFERRED EMBODIMENTS

The construction and the operating principle of an optical switch according to a first embodiment of the present invention will be described with reference to FIGS. 1A to 2C.

Figure 1A:
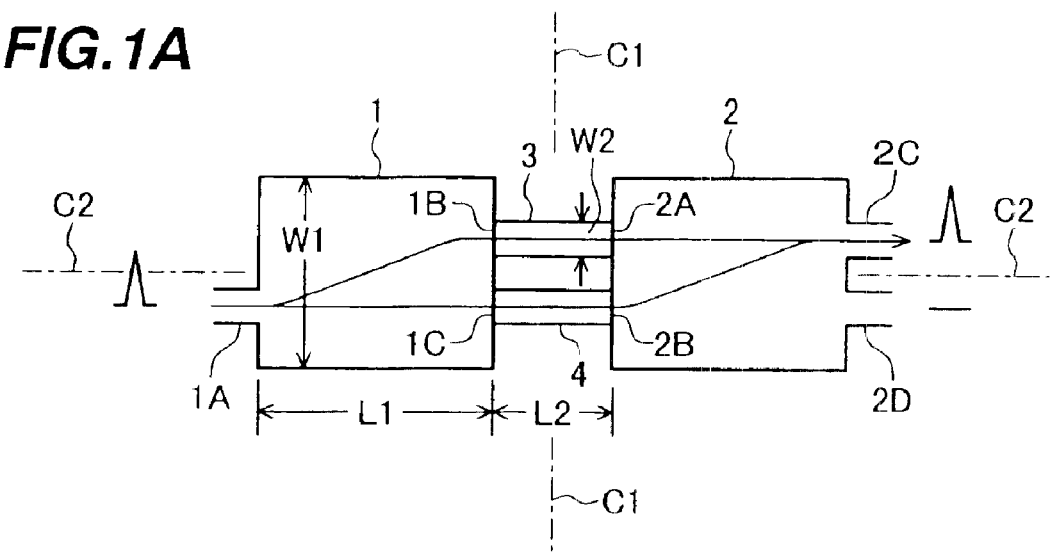
FIGS. 1A and 1B are schematic plan views of an optical switch according to a first embodiment of the present invention.

FIG. 1A is a schematic plan view of the optical switch according to the first embodiment. The optical switch according to the first embodiment comprises a first-stage multimode interferometer (MMI) 1, a second-stage multimode interferometer (MMI) 2, and non-linear waveguides 3 and 4. Each of the MMIs 1 and 2 has a multilayered guide structure made up of a core layer having relative permitivity of 3.25 and clad layers having relative permitivity of 3.18 and sandwiching the core layer from above and below. The core layer has a width (length of one vertical side in FIG. 1A) W1 of 15 μm in a direction perpendicular to the light incident direction, and a length (length of one horizontal side in FIG. 1A) L1 of 320 μm in a direction parallel to the light incident direction. Note that, in FIG. 1A, the length in the light incident direction is scaled down. For example, the core layer is made of InGaAs, and the clad layer is made of InP. The core layer and the clad layer can be formed on a substrate using those materials by metal organic chemical vapor deposition (MOCVD). The waveguides and the multimode interferometers are formed by a combination of lithography and regrowth commonly used in semiconductor processes.

The non-linear optical waveguides 3 and 4 are each constituted by a semiconductor optical amplifier (SOA). The SOA has a width (length of one vertical side in FIG. 1A) W2 of 2.5 μm and a length (length of one horizontal side in FIG. 1A) L2 of 140 μm. Even when the SOA length is increased over 140 μm for sufficient phase modulation of light passing it, the result of simulation, described below, remains the same. The refractive index of each of the non-linear waveguides 3 and 4 is changed upon optical or electrical excitation. The MMI 1, 2 and the non-linear waveguides 3, 4 are formed on a single semiconductor substrate.

The first-stage MMI 1 has one input port 1A, a first output port 1B, and a second output port 1C. The second-stage MMI 2 has a first input port 2A, a second input port 2B, a first output port 2C, and a second output port 2D. The non-linear waveguide 3 connects the first output port 1B of the first-stage MMI 1 to the first input port 2A of the second-stage MMI 2, and the non-linear waveguide 4 connects the second output port 1C of the first-stage MMI to the second input port 2B of the second-stage MMI 2.

The first-stage MMI 1 and the second-stage MMI 2 have a line-symmetrical shape with respect to a first imaginary straight line C1 connecting the centers of the non-linear waveguides 3 and 4. Also, the guide structure constituted by the first-stage MMI 1, the second-stage MMI 2, and the non-linear waveguides 3 and 4 has a line-symmetrical shape with respect to a second imaginary straight line C2 extending parallel to the light incident direction. The input port 1A of the first-stage MMI 1 and the first output port 2C of the second-stage MMI 2 are arranged in point-symmetrical positions with respect to an intersection between the first imaginary straight line C1 and the second imaginary straight line C2. The first output port 2C and the second output port 2D of the second-stage MMI 2 are arranged in linear-symmetrical positions with respect to the second imaginary straight line C2.

In a state in which the refractive indexes of both the non-linear waveguides 3 and 4 are not changed as shown in FIG. 1A, an optical signal introduced through the input port 1A of the first-stage MMI 1 passes the non-linear waveguides 3 and 4, and then exits from the first output port 2C of the second-stage MMI 2.

Figure 1B:
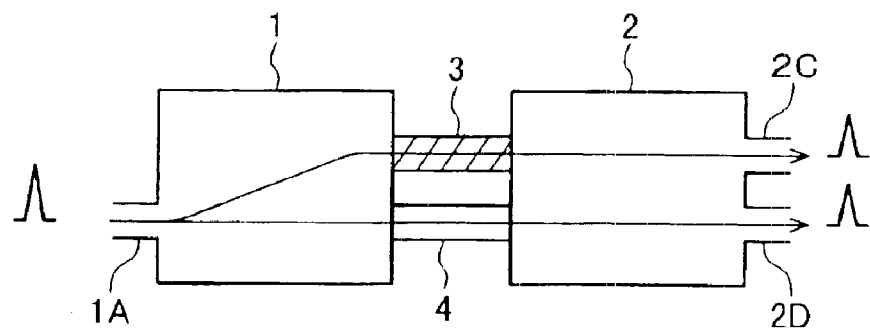

FIG. 1B shows a state in which the refractive index of the non-linear waveguide 3 is changed upon optical or electrical excitation. The non-linear waveguide 3 subjected to a change in the refractive index is indicated by hatching. In that state, the symmetry of an optical circuit is lost and the optical signal is delivered from the second output port 2D as well as the first output port 2C. The state in which the optical signal does not exit from the second output port 2D of the second-stage MMI 2 corresponds to an off-state, and the state in which the signal light exits from the second output port 2D corresponds to an on-state By changing the refractive index intermittently, the optical switch can be shifted from the off-state to the on-state.

Figure 2A:
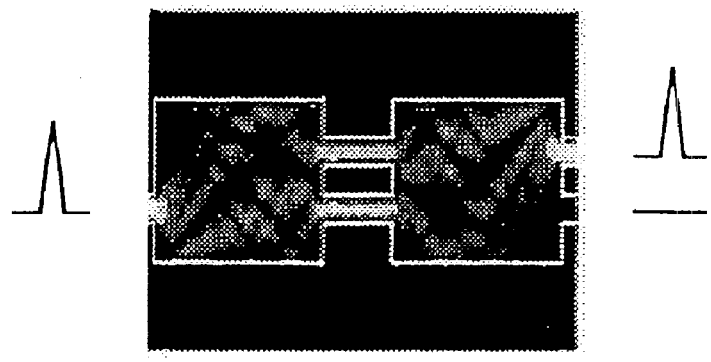
FIGS. 2A to 2C show results obtained by simulating propagation of an optical signal through the optical switch according to the first embodiment.
Figure 2B:
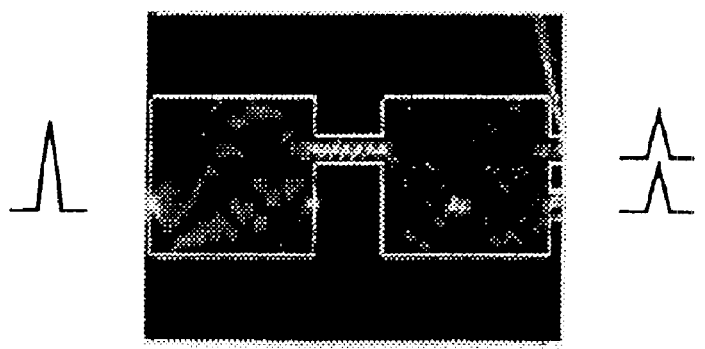
Figure 2C:
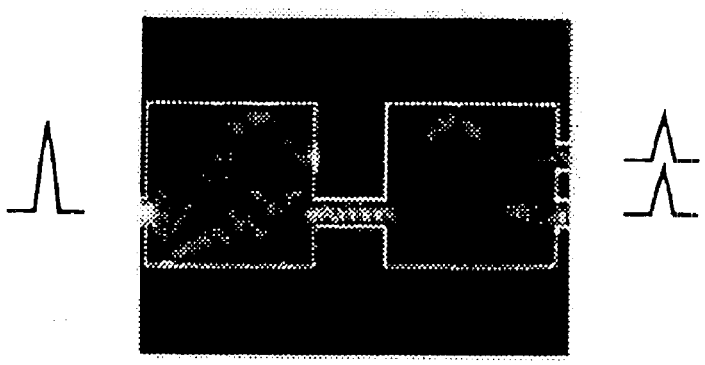

FIGS. 2A to 2C show results obtained by simulating optical paths of the optical switch shown in FIGS. 1A and 1B based on the beam propagation method. FIGS. 2A, 2B and 2C show respectively a state in which the refractive indexes of both the non-linear waveguides 3 and 4 are not changed, a state in which the refractive index of the non-linear waveguide 4 is changed, and a state in which the refractive index of the non-linear waveguide 3 is changed. Note that, in FIGS. 2A to 2C, white areas represent portions in which the light intensity is high.

As shown in FIG. 2A, it is confirmed that in the state in which the refractive indexes of both the non-linear waveguides 3 and 4 are not changed, the incident light passes the two non-linear waveguides 3 and 4 and then exits from the first output port 2C of the second-stage MMI 2, but does not exit from the second output port 2D of the second-stage MMI 2. As shown in FIGS. 2B and 2C, it is confirmed that in the state in which the refractive index of one of the non-linear waveguides 3 and 4 is changed, the optical signal exits from both the first output port 2C and the second output port 2D of the second-stage MMI 2.

Thus, since the optical signal does not essentially exit from the second output port 2D of the second-stage MMI 2 in the state in which the refractive indexes of both the non-linear waveguides 3 and 4 are not changed, an RZ (Return to Zero) switch is realized. Consequently, an optical switch having superior characteristics from practical point of view is obtained.

An optical switch according to a second embodiment of the present invention will be described below with reference to FIGS. 3, 4A and 4B.

Figure 3:
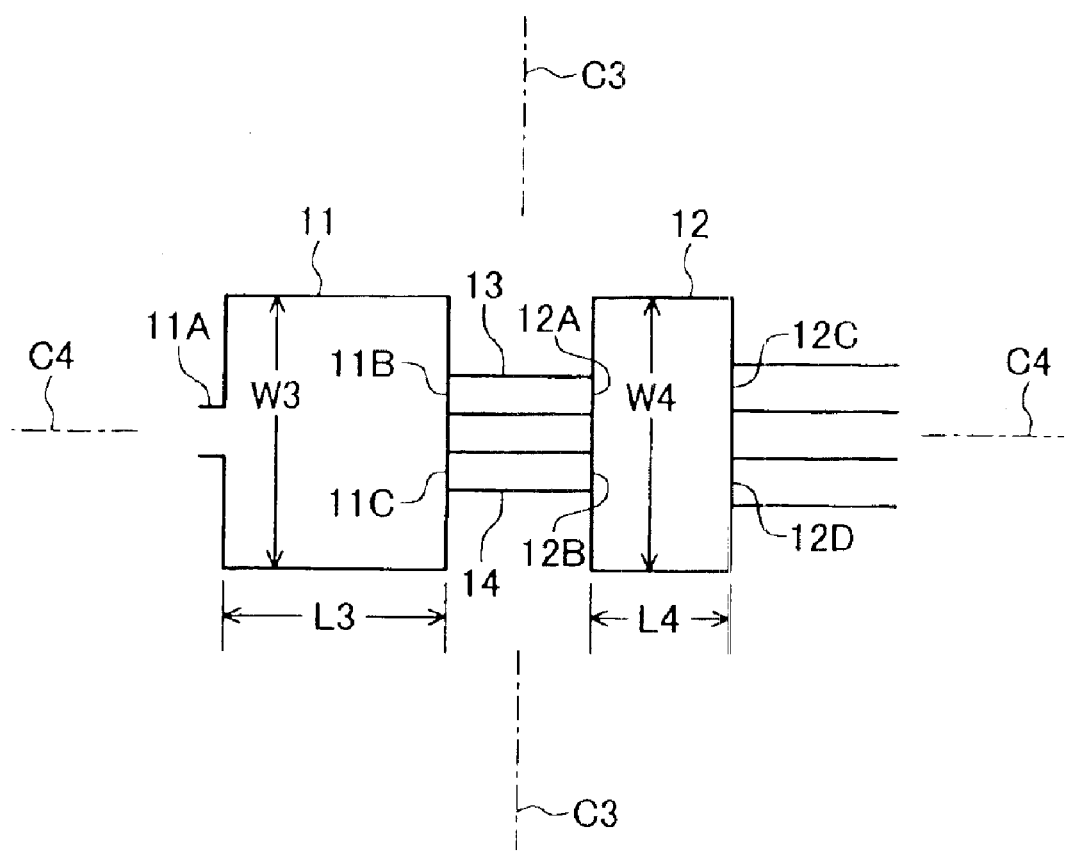
FIG. 3 is a schematic plan view of an optical switch according to a second embodiment of the present invention.

FIG. 3 is a schematic plan view of the optical switch according to the second embodiment. The optical switch according to the second embodiment comprises, as with the optical switch according to the first embodiment, a first-stage MMI 11, a second-stage MMI 12, and non-linear waveguides 13 and 14. Those components are connected in the same relation as those of the optical switch according to the first embodiment, but are different in shape and size from them.

A width W3 and length L3 of a core layer of the first-stage MMI 11 are respectively 15 μm and 130 μm. A width W4 and length L4 of a core layer of the second-stage MMI 12 are respectively 15 μm and 80 μm. Symmetry is lost with respect to a third imaginary straight line C3 passing middle points of the non-linear waveguides 13 and 14 in the longitudinal direction. Symmetry is maintained with respect to a fourth imaginary straight line C4 extending parallel to the light incident direction. An input port 11A of the first-stage MMI 11 is located on the fourth imaginary straight line C4.

Figure 4A:
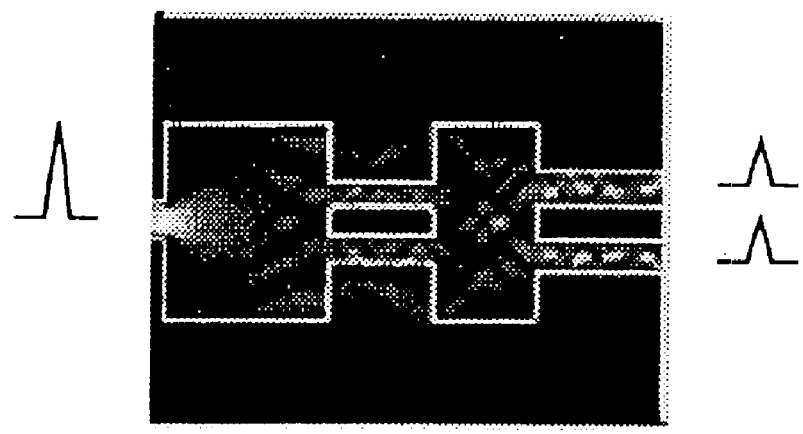
FIGS. 4A and 4B show results obtained by simulating propagation of an optical signal through the optical switch according to the second embodiment.
Figure 4B:
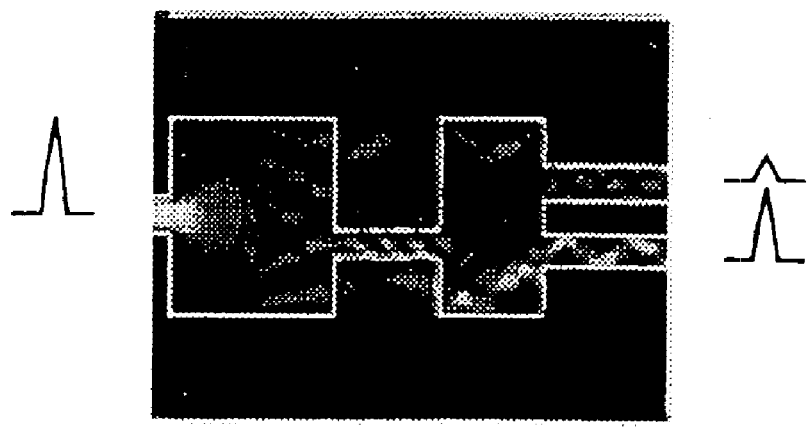

FIGS. 4A and 4B show results obtained by simulating optical paths of the optical switch shown in FIG. 3 based on the beam propagation method. FIG. 4A shows a state in which the refractive indexes of both the non-linear waveguides 13 and 14 are not changed, and FIG. 4B shows a state in which the refractive index of the non-linear waveguide 13 is changed. Note that, in FIGS. 4A and 4B, white areas represent portions in which the light intensity is high.

As shown in FIG. 4A, it is confirmed that in the state in which the refractive indexes of both the non-linear waveguides 13 and 14 are not changed, the incident light passes the two non-linear waveguides 13 and 14 and then exits from the two output ports 12C and 12D of the second-stage MMI 12 with intensities almost equal to each other. This is because the optical switch is line-symmetrical with respect to the fourth imaginary straight line C4.

As shown in FIG. 4B, it is confirmed that in the state in which the refractive index of the non-linear waveguide 13 is changed, the intensity of the light exiting from the first output port 12C of the second-stage MMI 12 is weakened, while the intensity of the light exiting from the second output port 12D of the second-stage MMI 12 is intensified. Since the intensity of the output light is thus changed, switching operation can be achieved. Unlike the first embodiment, however, an RZ switch is not realized.

The construction and the operation of an optical switch according to a third embodiment of the present invention will be described below with reference to FIGS. 5, 6A and 6B.

The optical switches according to the first and second embodiments are each of a two-stage construction of MMIs. The optical switch according to the third embodiment comprises one MMI 21 and two non-linear waveguides 22 and 23. A width W5 and length L5 of a core layer of the MMI 21 are respectively 15 μm and 320 μm. The MMI 21 has one input port 21A, a first output port 21B, and a second output port 21C.

The non-linear waveguides 22 and 23 are connected respectively to the first output port 21B and the second output port 21C.

Figure 5:
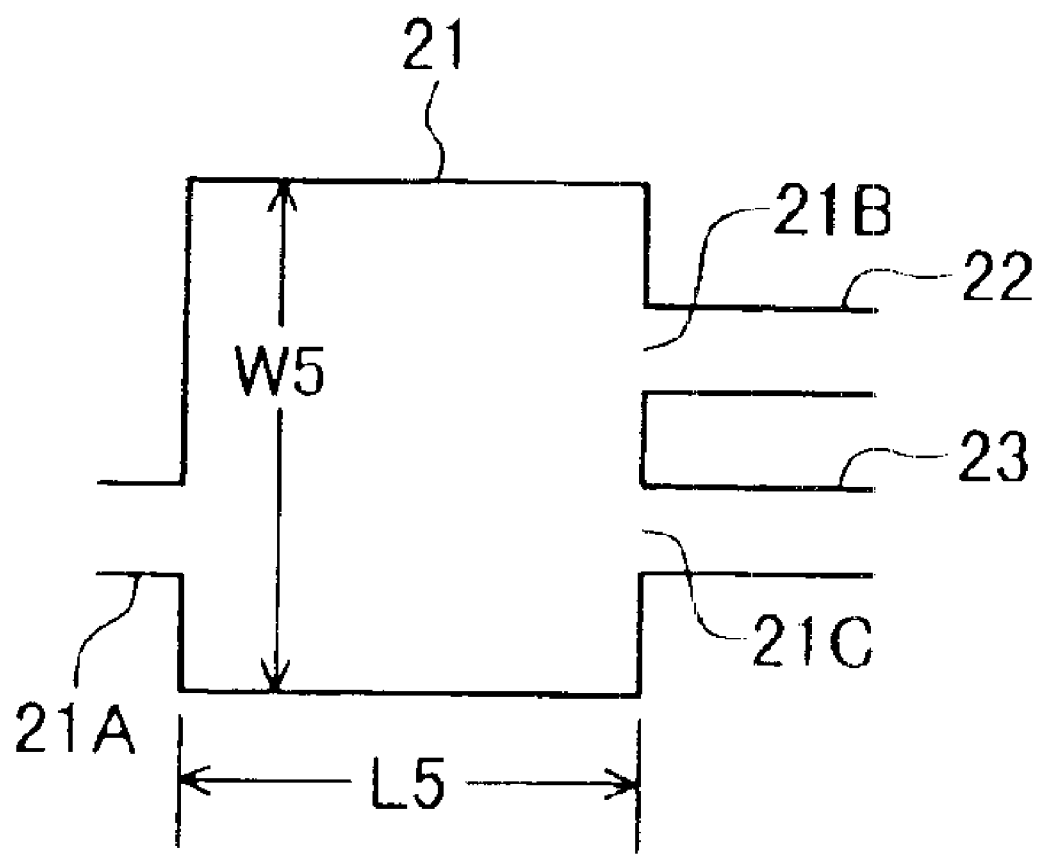
FIG. 5 is a schematic plan view of an optical switch according to a third embodiment of the present invention.
Figure 6A:
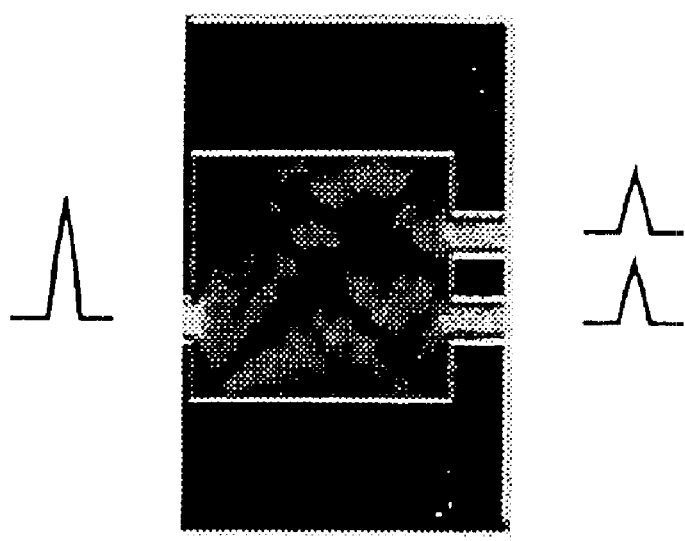
FIGS. 6A and 6B show results obtained by simulating propagation of an optical signal through the optical switch according to the third embodiment.
Figure 6B:
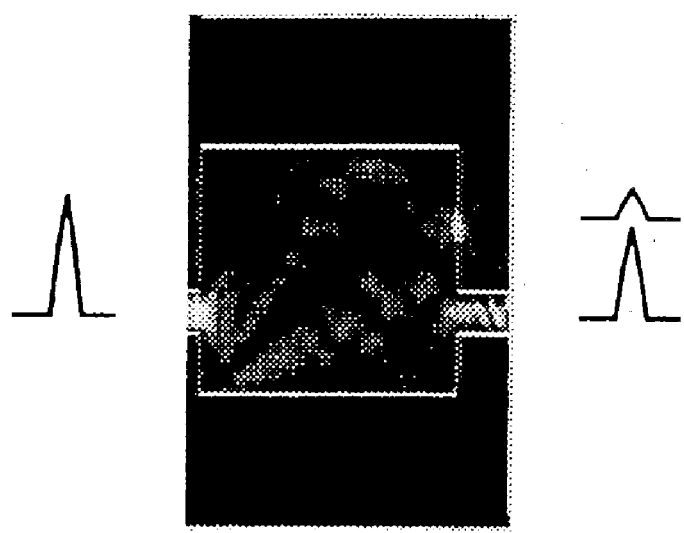

FIGS. 6A and 6B show results obtained by simulating optical paths of the optical switch shown in FIG. 5 based on the beam propagation method. FIG. 6A shows a state in which the refractive indexes of both the non-linear waveguides 22 and 23 are not changed, and FIG. 6B shows a state in which the refractive index of the non-linear waveguide 22 is changed. Note that, in FIGS. 6A and 6B, white areas represent portions in which the light intensity is high.

As shown in FIG. 6A, it is confirmed that in the state in which the refractive indexes of both the non-linear waveguides 22 and 23 are not changed, the incident light propagates through the two non-linear waveguides 22 and 23 with intensities almost equal to each other.

As shown in FIG. 6B, it is confirmed that in the state in which the refractive index of the non-linear waveguide 22 is changed, the intensity of the light exiting from the second output port 21C is intensified, while the intensity of the light exiting from the first output port 21B is weakened. Since the intensity of the output light is thus changed, switching operation can be achieved. As with the second embodiment, however, an RZ switch is not realized.

A description is now made of a practical method for changing the refractive index of each of the non-linear waveguides used in the first to third embodiments.

Figure 7:
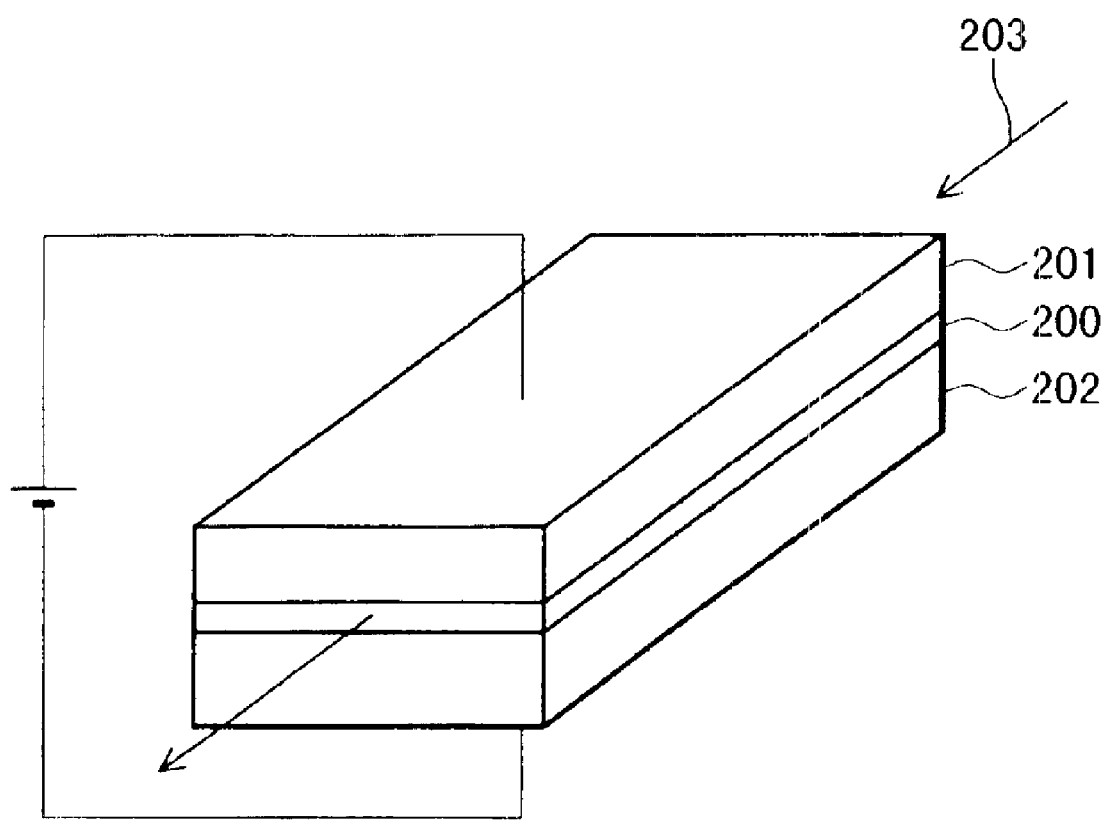
FIG. 7 is a perspective view of a non-linear waveguide (semiconductor optical amplifier) used in the optical switch according to any of the embodiments.

FIG. 7 is a schematic perspective view of a semiconductor optical amplifier (SOA) constituting the non-linear waveguide. The SOA has a structure in which an active layer 200 having a gain for amplification of light is sandwiched by a p-type semiconductor layer 201 and an n-type semiconductor layer 202. The active layer 200 is formed as a quantum well layer or a semiconductor layer made of a semiconductor material having a smaller band gap than those of the semiconductor layers 201 and 202 on both sides. For example, the active layer 200 is made of InGaAsP, and the semiconductor layers 201 and 202 on both sides are made of InP.

Upon a forward bias being applied to the active layer 200, a carrier distribution in the active layer 200 is brought into an inverted population state and the refractive index of the active layer 200 is changed. When an optical signal 203 enters the active layer 200 through one end surface thereof in such a state, the optical signal is subjected to phase modulation depending on the refractive index of the active layer 200 and then exits from the other end surface on the opposite side.

Thus, the refractive index of the non-linear waveguide can be changed by applying an electrical signal to the non-linear waveguide constituted by the SOA.

The method for electrically changing the refractive index of the non-linear waveguide has been described above with reference to FIG. 7. In that method, however, the response speed of the optical switch is limited by the processing speed of an electrical signal. To achieve higher-speed switching, it is preferably that the refractive index of the non-linear waveguide be changed using an optical signal. A method for changing the refractive index with an optical signal will be described below.

FIG. 8 is a schematic sectional view of an optical system for changing the refractive index of the non-linear waveguide in the optical switch according to the first embodiment shown in FIGS. 1A and 1B. A pair of reflecting mirrors 31 and 32 arranged so as to sandwich the non-linear waveguide 3 therebetween with their reflecting surfaces positioned to face each other. A control light waveguide 33 is arranged above the first-stage MMI 1 parallel to the substrate surface. A reflecting mirror 30 is arranged in an obliquely opposite relation to an exit end of the control light waveguide 33 for reflecting a control light con having exited from the control light waveguide 33.

The pair of reflecting mirrors 31 and 32 can be each formed of, e.g., a dielectric or a multilayered film of semiconductors. The obliquely located reflecting mirror 30 can be formed by obliquely etching an end surface of the control light waveguide 33.

The control light con having exited from the control light waveguide 33 is reflected by the obliquely located reflecting mirror 30 toward the substrate (non-linear waveguide). The control light con reflected by the reflecting mirror 30 is then repeatedly reflected by the pair of reflecting mirrors 31 and 32. While repeating the reflection, the control light con excites the non-linear waveguide 3 and changes the refractive index thereof.

The construction and the operation of an optical switch according to a fourth embodiment of the present invention will be described below with reference to FIGS. 9A to 9C.

Figure 9A:
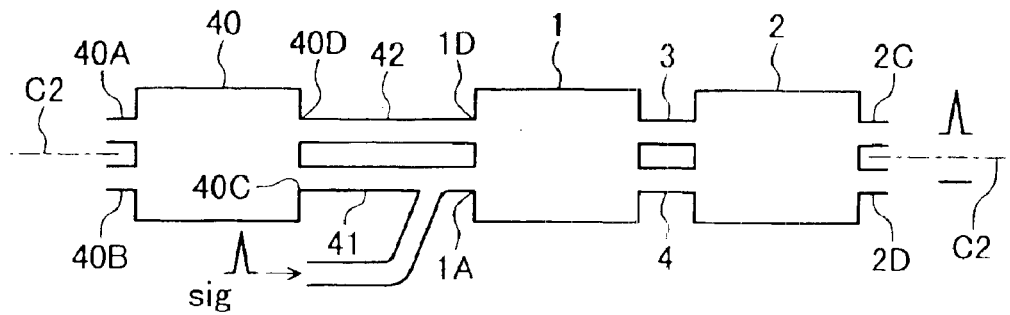
FIGS. 9A to 9C are schematic plan views of an optical switch according to a fourth embodiment of the present invention.

FIG. 9A is a schematic plan view of the optical switch according to the fourth embodiment. In addition to the first-stage MMI 1, the second-stage MMI 2, and the non-linear waveguides 3 and 4 according to the first embodiment shown in FIGS. 1A and 1B, the optical switch according to the fourth embodiment further comprises a control light introducing MMI 40 and two waveguides 41 and 42. While the first-stage MMI 1 has only one input port 1A in the first embodiment, another input port 1D is provided in the fourth embodiment at a position symmetrical to the (first) input port 1A with respect to the second imaginary straight line C2.

The control light introducing MMI 40 has a first input port 40A, a second input port 40B, a first output port 40C, and a second input port 40D. The waveguide 41 connects the first output port 40C of the control light introducing MMI 40 to the first input port 1A of the first-stage MMI 1. Also, an optical signal sig is combined with a control light propagating through the waveguide 41 and then introduced to the first input port 1A of the first-stage MMI 1. The optical signal sig has wavelength of, e.g., 1.55 $\mu$m, and the control light has wavelength, e.g., 1.3 $\mu$m or 1.48 $\mu$m, shorter than that of the optical signal.

Figure 9B:
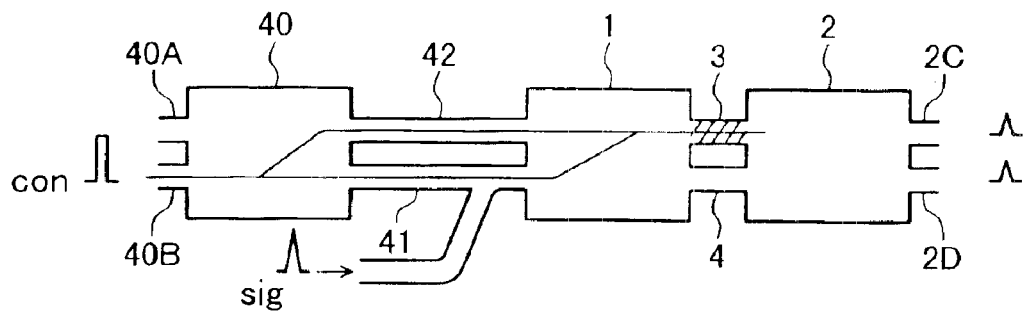

As shown in FIG. 9B, when a control light pulse con is applied to the second input port 40B of the control light introducing MMI 40, the control light pulse con passes both the waveguides 41 and 42 and then enters the non-linear waveguide 3. Accordingly, the non-linear waveguide 3 is excited and its refractive index is changed. A thus-resulting state is the same as that shown in FIG. 2C. Hence, the optical signal sig exits from both the first output port 2C and the second output port 2D of the second-stage MMI 2 with intensities almost equal to each other.

Figure 9C:
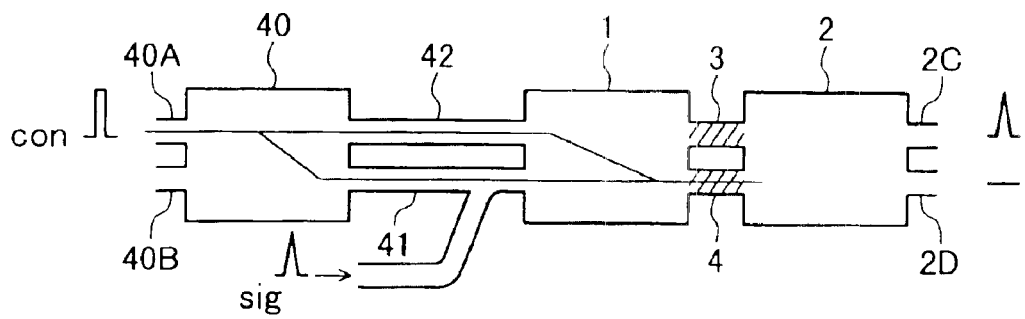

As shown in FIG. 9C, when the control light pulse con is applied to the first input port 40A of the control light introducing MMI 40, the control light pulse con reaches the non-linear waveguide 4. Accordingly, the non-linear waveguide 4 is excited and its refractive index is changed.

Figure 10:
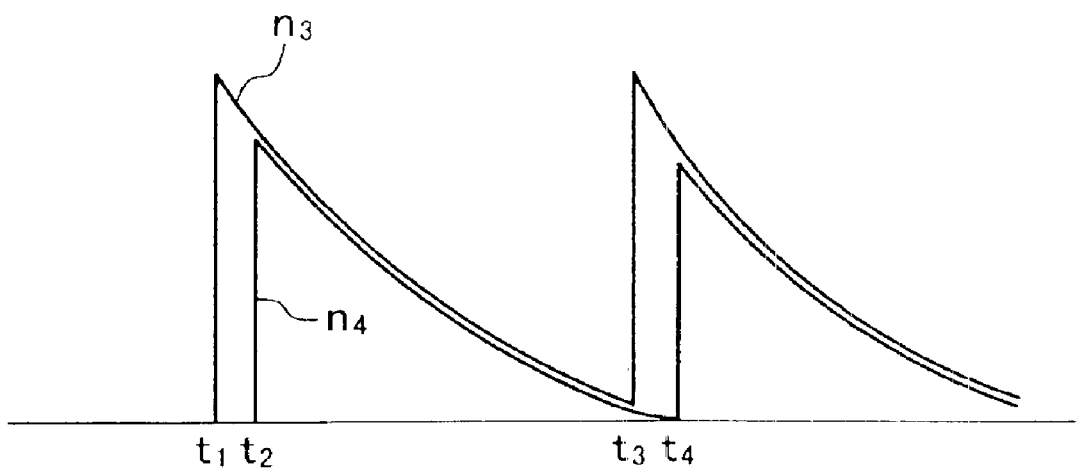
FIG. 10 is a graph showing time-dependent variations in refractive index of each of two non-linear waveguides, which are used in the optical switch according to the fourth embodiments.

FIG. 10 shows time-dependent variations in refractive index of each of the non-linear waveguides 3 and 4. Curves $n_3$ and $n_4$ represent the refractive indexes of the non-linear waveguides 3 and 4, respectively. At time $t_1$, as shown in FIG. 9B, the control light pulse con is applied and the refractive index of the non-linear waveguide 3 is changed. The refractive index having changed is restored to its original value at a predetermined time constant. At time $t_2$, as shown in FIG. 9C, the control light pulse con is applied and the refractive index of the non-linear waveguide 4 is changed. The non-linear waveguides 3 and 4 are designed such that the refractive index $n_4$ of the non-linear waveguide 4 is substantially equal to the refractive index $n_3$ of the non-linear waveguide 3 at that time $t_2$.

When the control light pulse con is applied as shown in FIG. 9C and the refractive indexes of the non-linear waveguides 3 and 4 are both changed similarly, symmetry of the optical circuit is restored and maintained. As with the state of FIG. 9A, therefore, the optical signal sig exits only from the first output port 2C of the second-stage MMI 2, and the optical signal sig does not exit from the second output port 2D of the second-stage MMI 2. Consequently, the optical signal sig is delivered from the second output port 2D of the second-stage MMI 2 during a period between the time $t_1$ and $t_2$, but is not delivered from the second output port 2D after the time $t_2$.

Then, as shown in FIG. 10, the control light pulse con is applied through the second input port 40B of the control light introducing MMI 40 at time $t_3$, and is applied through the first input port 40A thereof at time $t_4$. As a result, the optical signal sig can be delivered from the second output port 2D of the second-stage MMI 2 during a period between the time $t_3$ and time $t_4$.

By repeating the above-described operation periodically, the optical signal sig can be delivered from the second output port 2D only during a desired period. The control made at the time $t_1$ and $t_3$ in FIG. 10 is called push control, and the control made at the time $t_2$ and $t_4$ is called pull control. Thus, the optical switch according to the fourth embodiment is able to perform the push-pull control.

The light delivered from the output port is subjected to filtering through a wavelength filter, whereby only the optical signal can be taken out while cutting the control light. This results in an improved S/N ratio of the optical signal.

The construction and the operation of an optical switch according to a fifth embodiment of the present invention will be described below with reference to FIGS. 11A and 11B.

Figure 11A:
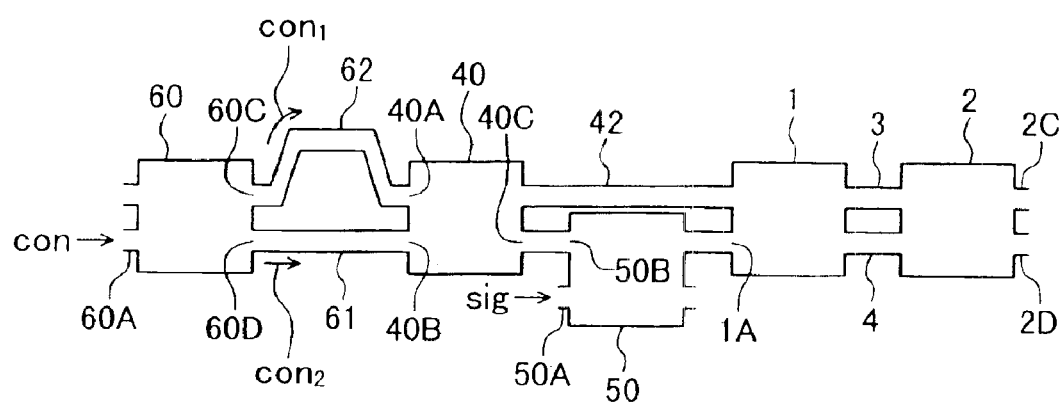
FIG. 11A is a schematic plan view of an optical switch according to a fifth embodiment of the present invention.

FIG. 11A is a schematic plan view of the optical switch according to the fifth embodiment. A description is made of the difference between the optical switch of the fifth embodiment and the optical switch of the fourth embodiment shown in FIG. 9A.

While the optical signal sig and the control light pulse con are combined with each other in the waveguide 41 in the fourth embodiment, a combining MMI 50 combines the optical signal sig and the control light pulse con with each other in the fifth embodiment.

The optical signal sig is introduced to a first input port 50A of the combining MMI 50. The control light pulse con having exited from the first output port 40C of the control light introducing MMI 40 is applied to a second input port 50B of the combining MMI 50. The optical signal sig and the control light pulse con having exited from an output port of the combining MMI 50 are introduced to the first input port 1A of the first-stage MMI 1.

A control light branching MMI 60 is arranged upstream of the control light introducing MMI 40. The control light branching MMI 60 has an input port 60A, a first output port 60C and a second output port 60D. The first output port 60C is connected to the first input port 40A of the control light introducing MMI 40 through a waveguide 62, and the second output port 60D is connected to the second input port 40B of the control light introducing MMI 40 through a waveguide 61. The waveguide 62 is longer than the waveguide 61. In other words, the waveguide 62 constitutes a delay circuit.

The control light pulse con is applied through the input port 60A of the control light branching MMI 60. The control light pulse con is substantially equally divided and exits from the first output port 60C and the second output port 60D. A control light pulse $con_1$ passing the waveguide 62 reaches the control light introducing MMI 40 at timing delayed from a control light pulse $con_2$ passing the waveguide 61. This delay time corresponds to the period from the time $t_1$ to $t_2$ shown in FIG. 10. Therefore, the push-pull control can be performed by applying only one the control light pulse con.

Figure 11B:
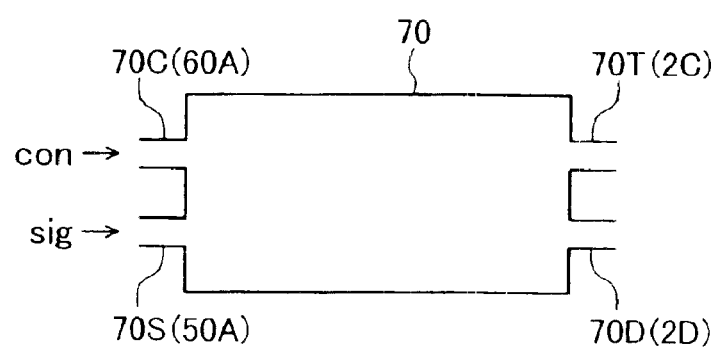
FIG. 11B is a block diagram of the optical switch.

FIG. 11B is a block diagram of an optical switch 70, in which an internal optical circuit of the optical switch shown in FIG. 11A is represented as a black box. The optical switch 70 has a control light input port 70C to which the control light pulse con is applied, an optical signal input port 70S to which the optical signal sig is applied, and two output ports 70T and 70D. The control light input port 70C corresponds to the input port 60A of the control light branching MMI 60 shown in FIG. 11A, and the optical signal input port 70S corresponds to the input port 50A of the combining MMI 50 shown in FIG. 11A. Further, the output ports 70T and 70D correspond respectively to the output ports 2C and 2D of the second-stage MMI 2 shown in FIG. 11A.

When the control light pulse con is applied through the control light input port 70C, the optical signal sig is delivered from the output port 70D for a certain period. The output port 70D is hence called a drop signal output port. Also, the other output port 70T is called a through signal output port. In this specification, the optical switch 70 is called a drop device.

Figure 12:
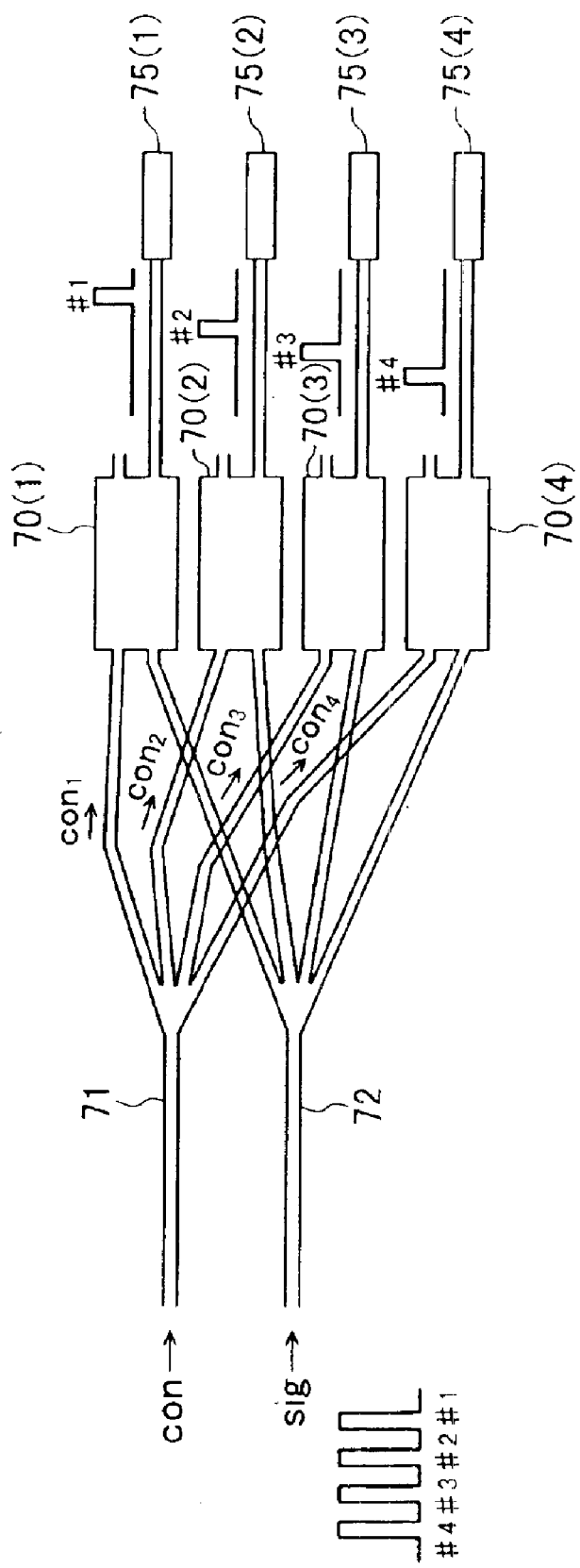
FIG. 12 is a schematic plan view of an optical demultiplexer according to a sixth embodiment of the present invention.

FIG. 12 is a schematic plan view of an optical demultiplexer according to a sixth embodiment of the present invention. The optical demultiplexer according to the sixth embodiment comprises four drop devices 70(1) to 70(4), four optoelectronic transducers 75(1) to 75(4), an optical signal waveguide 72, and a control light waveguide 71. Each of the drop devices 70(1) to 70(4) is the same as the drop device 70 according to the fifth embodiment shown in FIG. 11B.

An optical signal sig, which is time-division multiplexed at multiplicity of 4 and contains pulses of channels #1 to #4, is branched into four optical signals by the optical signal waveguide 72. The branched optical signals sig are introduced to respective optical signal input ports of the drop devices 70(1) to 70(4).

A control light pulse con is branched into four control light pulses $con_1$ to $con_4$ by the control light waveguide 71. The branched control light pulses $con_1$ to $con_4$ are applied to respective control light input ports of the drop devices 70(1) to 70(4). The four control light pulses $con_1$ to $con_4$ reach the corresponding drop devices 70(1) to 70(4) at delays gradually shifted in units of a certain time. More specifically, at the time when the pulse in the channel #i of the signal sig reaches the drop device 70(i), the control light pulse $con_i$ reaches the drop device 70(i). The pull control is thereby performed. Then, until arrival of the pulse in the channel #(i+1), the push control is completed.

Thus, only the pulse in the channel #i is delivered from a drop signal output port of the drop device 70(i). It is therefore possible to demultiplex the time-division multiplexed optical signal sig and to obtain individual signals in respective channels. From an optical signal of 160 Gbits/s, for example, four optical signals of 40 Gbits/s can be obtained. The optical signal in the channel #i is inputted to the optoelectronic transducer 75(i) for conversion into an electrical signal.

Figure 13:
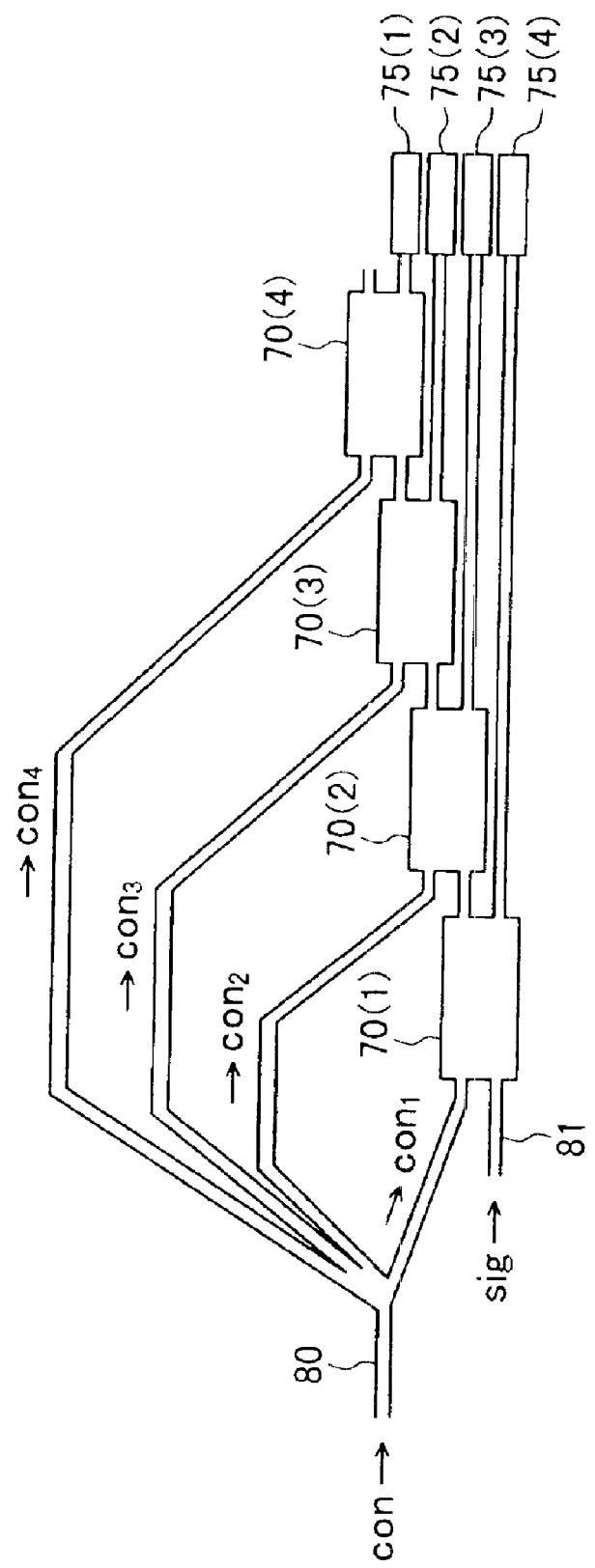
FIG. 13 is a schematic plan view of an optical demultiplexer according to a seventh embodiment of the present invention.

FIG. 13 is a schematic plan view of an optical demultiplexer according to a seventh embodiment of the present invention. While the four drop devices are connected in parallel in the optical demultiplexer of the sixth embodiment, the optical demultiplexer of the seventh embodiment comprises four drop devices 70(1) to 70(4) connected in series. Stated otherwise, a through signal output port of the drop device 70(i) is connected to an optical signal input port of the drop device 70(i+1) in the next stage. Optoelectronic transducers 75(1) to 75(4) are connected to respective drop signal output ports of the drop devices 70(1) to 70(4).

An optical signal sig, which is time-division multiplexed at multiplicity of 4, is introduced to the optical signal input port of the first-stage drop device 70(1). A control light pulse con is branched into four control light pulses $con_1$ to $con_4$. The branched control light pulses $con_1$ to $con_4$ are applied to respective control light input ports of the drop devices 70(1) to 70(4).

A control light waveguide 80 delays the control light pulses $con_1$ to $con_4$ by respective predetermined periods of time so that at the time when a pulse in the channel #i of the signal sig reaches the drop device 70(i), the control light pulse $con_i$ reaches the drop device 70(i). Upon the control light pulse $con_i$ reaching the drop device 70(i), the pull control is performed in the drop device 70(i). Then, until arrival of the pulse in the channel #(i+1), the push control is completed.

Thus, only the pulse in the channel #i is delivered from a drop signal output port of the drop device 70(i). It is therefore possible to demultiplex the time-division multiplexed optical signal sig and to obtain individual signals in respective channels. The optical signal in the channel #i is inputted to the optoelectronic transducer 75(i) for conversion into an electrical signal.

The sixth and seventh embodiments have been described in connection with the case of demultiplexing an optical signal multiplexed at multiplicity of 4. Generally, when demultiplexing an optical signal multiplexed at multiplicity of N, a number N of drop devices are connected in parallel or in series.

Also, in the sixth and seventh embodiments, one control light pulse is branched and a plurality of branched control light pulses are applied so as to reach the corresponding drop devices at delays gradually shifted in units of a certain time. Accordingly, there is no need of generating the control light pulse for each of the time-division multiplexed channels.

Advantages of the sixth and seventh embodiments will now be described while comparing both the embodiments with each other.

In the sixth embodiment, since the optical signal sig is evenly divided into four rays, the intensity of the optical signal sig inputted to each drop device 70(*i*) is about ¼ of the intensity of the original optical signal sig. In the seventh embodiment, however, since one ray of original optical signal sig passes the four drop devices 70(1) to 70(4) successively, the signal intensity is hardly reduced. As a result, in the seventh embodiment, the intensity of the optical signal in each separated channel can be maintained at a high level.

In the seventh embodiment, each time the optical signal sig passes the drop device 70(*i*), the signal purity is reduced. For example, the signal waveform is deformed, or noise is mixed, or jitter occurs. On the other hand, in the sixth embodiment, deterioration of the signal purity hardly occurs.

In the sixth embodiment, branches of the control light waveguide 71 cross branches of the optical signal waveguide 72. Therefore, due care is required in design of the waveguides.

The construction and the operation of an optical switch according to an eighth embodiment of the present invention will be described below with reference to FIGS. 14A to 14C. While the first-stage MMI and the second-stage MMI are connected by two non-linear waveguides in the first to seventh embodiments described above, both the MMIs may be connected using three or more waveguides. In that case, at least one of the three or more waveguides requires to be a non-linear waveguide. In the eighth embodiment, four waveguides are used to connect the first-stage MMI and the second-stage MMI.

Figure 14A:
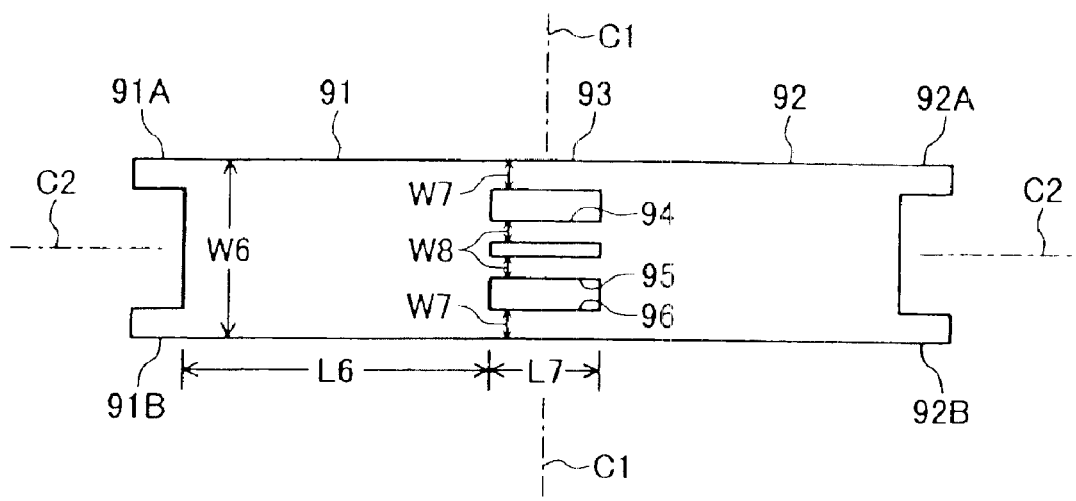
FIG. 14A is a schematic plan view of an optical switch according to an eighth embodiment of the present invention.

FIG. 14A is a schematic plan view of the optical switch according to the eighth embodiment. A first-stage MMI 91 and a second-stage MMI 92 are connected to each other by four waveguides 93, 94, 95 and 96. The first-stage MMI 91 has a first input port 91A and a second input port 91B, and the second-stage MMI 92 has a first output port 92A and a second output port 92B.

The first-stage MMI 91, the second-stage MMI 92 and the waveguides 93 to 96 are line-symmetrical with respect to an imaginary straight line C2 extending parallel to the light incident direction. The waveguides 94 and 95 are arranged in symmetrical positions with respect to each other. The waveguides 93 and 96 are arranged outside the waveguides 94 and 95, respectively. The waveguides 94 and 95 are non-linear waveguides, whereas the waveguides 93 and 96 are normal waveguides.

Each of the first-stage MMI 91 and the second-stage MMI 92 has a width W6 of 12 μm and a length L6 of 345 μm. A length L7 of each of the waveguides 93 to 96 is 100 μm. The waveguides 93 and 96 have a width W7 of 1.5 μm, and the waveguides 94 and 95 have a width W8 of 1.0 μm. The two input ports 91A and 91B are arranged at opposite ends of one side of the first-stage MMI 91 on the input side, and the two output ports 92A and 92B are arranged at opposite ends of another side of the second-stage MMI 92 on the output side.

Figure 14B:
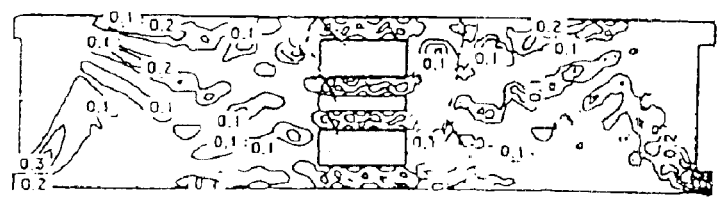
FIGS. 14B and 14C show results obtained by simulating propagation of an optical signal through the optical switch.
Figure 14C:
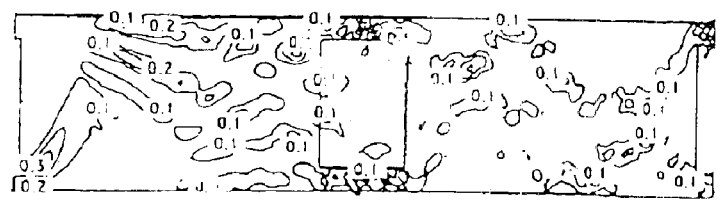
Figure 15A:
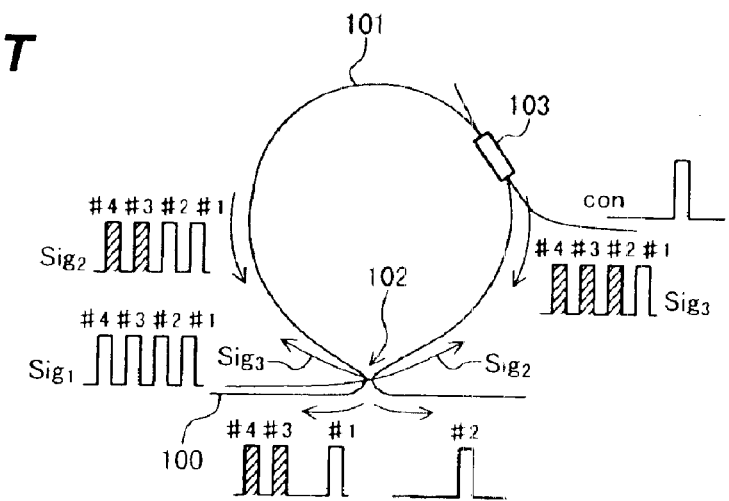
FIGS. 15A to 15C are schematic views of conventional optical demultiplexers.
Figure 15B:
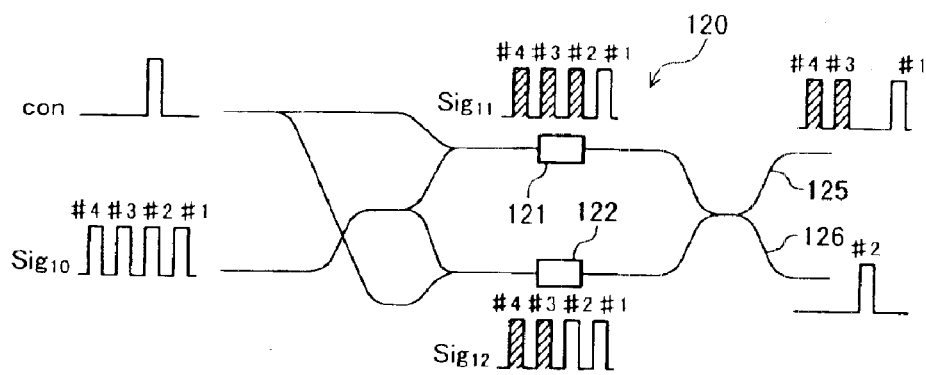
Figure 15C:
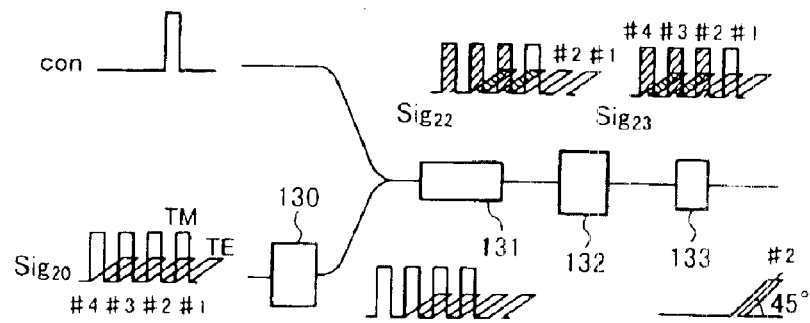

FIGS. 14B and 14C show results obtained by simulating optical paths of the optical switch of this embodiment based on the beam propagation method. FIG. 14B shows a state in which the refractive indexes of both the non-linear waveguides 94 and 95 are not changed, and FIG. 14C shows a state in which the refractive indexes of both the non-linear waveguides 94 and 95 are changed. A core portion of each of the first-stage MMI 91, the second-stage MMI 92, and the waveguides 93 and 96 has the refractive index of 3.25, and a clad portion around the core portion has the refractive index of 3.18. The refractive index of the core portions of the waveguides 94 and 95 is 3.25 in the state of FIG. 14B, but 3.18 in the state of FIG. 14C. Enclosed curves in FIGS. 14B and 14C represent equi-light intensity lines.

As shown in FIG. 14B, it is confirmed that in the state in which the refractive indexes of both the non-linear waveguides 94 and 95 are not changed, an optical signal introduced through the second input port 91B of the first-stage MMI 91 passes the four waveguides 93 to 96 and then exits from the second output port 92B of the second-stage MMI 92. The optical signal does not exit from the first output port 92A of the second-stage MMI 92.

As shown in FIG. 14C, it is confirmed that in the state in which the refractive indexes of both the non-linear waveguides 94 and 95 are changed, an optical signal introduced through the second input port 91B of the first-stage MMI 91 passes the two waveguides 93 and 96 on the opposite outer sides and then exits from the two output ports 92A and 92B of the second-stage MMI 92. The optical signal exiting from the first output port 92A has higher intensity than that exiting from the second output port 92B.

As seen from the simulation results shown in FIGS. 14B and 14C, the optical switch according to the eighth embodiment can be used as a drop device in which the second output port 92B of the second-stage MMI 92 serves a through signal output port and the first output port 92A thereof serves as a drop signal output port.

In any of the optical switches and the optical demultiplexers according to the first to eighth embodiments, a plurality of optical elements can be of a monolithic structure formed on a single semiconductor substrate. The device size can be therefore reduced. However, the optical switch and the optical demultiplexer are not necessarily required to be in a monolithic structure, and an optical fiber or an optical crystal can also be used to form the waveguide.

Further, since the operations of the optical switches and the optical demultiplexers according to the first to eighth embodiments are not dependent on the polarization state of an optical signal, the optical signal having exited from an optical fiber can be processed in a desired manner.

The present invention has been described above in connection with the preferred embodiments, but the present invention is not limited to the illustrated embodiments. It is apparent to those skilled in the art that, for example, various modifications, improvements, and combinations thereof can be made on the present invention.

What is claimed is:

1. An optical demultiplexer comprising:
   a plurality of drop devices, each of the drop devices having a control light input port to which a control light is applied, an optical signal input port to which an optical signal is applied, and a drop signal output port from which the optical signal is delivered in synchronous with inputting of the control light;
   a signal waveguide for branching a time-division multiplexed optical signal and introducing a plurality of branched optical signals respectively to the optical signal input ports of the drop devices; and
   a control waveguide for branching one control light and introducing a plurality of branched control lights to reach the corresponding drop devices at delays gradually shifted in units of a certain time.

2. An optical demultiplexer comprising:
   a number N (N is two or larger integer) of drop devices, each of the drop devices having a control light input port to which a control light is applied, an optical signal input port to which an optical signal is applied, and a drop signal output port from which the optical signal is delivered in synchronous with inputting of the control light;

a signal waveguide for introducing an optical signal, which is time-division multiplexed at multiplicity of N and has a number N of channels, to the optical signal input port of each of the drop devices; and a control waveguide for branching one control light into a number N of control lights and introducing an i-th (i is an integer not smaller than 1 but not larger than N) one of the branched control lights to the control light input port of an i-th drop device, the signal waveguide and the control waveguide delaying one of the control light and the optical signal relative to the other such that the control light applied to the i-th drop device is in synchronous with an i-th channel of the optical signal applied to the i-th drop device.

3. An optical demultiplexer comprising:

a number N (N is two or larger integer) of drop devices arranged from a first stage to an N-th stage, each of the drop devices having a control light input port to which a control light is applied, an optical signal input port to which an optical signal is applied, a drop signal output port from which the optical signal is delivered in synchronous with inputting of the control light, and a through signal output port from which the optical signal is delivered at least during a period in which the optical signal is not delivered from the drop signal output port;

a first signal waveguide for introducing a time-division multiplexed optical signal to the optical signal input port of the first-stage drop device;

a second signal waveguide for connecting the through signal output port of each drop device to the optical signal input port of the drop device in a next stage; and a control waveguide for branching one control light and introducing a plurality of branched control lights to reach the corresponding drop devices at delays gradually shifted in units of a certain time toward a most downstream stage.

4. An optical demultiplexer according to claim 3, wherein the optical signal is a signal having a number N of time-division multiplexed channels, and wherein the control waveguide delays the control light inputted to an i-th (i is an integer not smaller than 1 but not larger than N) drop device to be in synchronous with an i-th channel of the optical signal inputted to the i-th drop device.

5. An optical demultiplexer according to claim 1, wherein each of the drop devices is constituted by an optical switch, the optical switch comprising:

a first multimode interferometer having a first input port to which an optical signal is applied, and at least two output ports;

a first optical waveguide connected to one or each of plural first output ports, which is or are selected from the output ports, and allowing a light exiting from the one or plural first output ports to propagate therethrough, the first optical waveguide having a refractive index changed in response to a trigger signal externally applied;

a second optical waveguide connected to one or each of plural second output ports, which is or are selected from the output ports, and allowing a light exiting from the one or plural second output ports to propagate therethrough; and trigger for supplying, to the first optical waveguide, the trigger signal for changing the refractive index of the first optical waveguide, and wherein the first multimode interferometer has a second input port other than the first input port, and wherein the trigger comprises:

a third multimode interferometer having a first input port to which a control light is applied, a first output port, and a second output port;

a third optical waveguide for introducing a light having exited from the second output port of the third multimode interferometer to the second input port of the first multimode interferometer; and a combining optical element for combining a light having exited from the first output port of the third multimode interferometer with the optical signal, and introducing a combined light to the first input port of the first multimode interferometer.

6. An optical demultiplexer according to claim 2, wherein each of the drop devices is constituted by an optical switch, the optical switch comprising:

a first multimode interferometer having a first input port to which an optical signal is applied, and at least two output ports;

a first optical waveguide connected to one or each of plural first output ports, which is or are selected from the output ports, and allowing a light exiting from the one or plural first output ports to propagate therethrough, the first optical waveguide having a refractive index changed in response to a trigger signal externally applied;

a second optical waveguide connected to one or each of plural second output ports, which is or are selected from the output ports, and allowing a light exiting from the one or plural second output ports to propagate therethrough; and trigger for supplying, to the first optical waveguide, the trigger signal for changing the refractive index of the first optical waveguide, and wherein the first multimode interferometer has a second input port other than the first input port, and wherein the trigger comprises:

a third multimode interferometer having a first input port to which a control light is applied, a first output port, and a second output port;

a third optical waveguide for introducing a light having exited from the second output port of the third multimode interferometer to the second input port of the first multimode interferometer; and a combining optical element for combining a light having exited from the first output port of the third multimode interferometer with the optical signal, and introducing a combined light to the first input port of the first multimode interferometer.

7. An optical demultiplexer according to claim 3, wherein each of the drop devices is constituted by an optical switch, the optical switch comprising:

a first multimode interferometer having a first input port to which an optical signal is applied, and at least two output ports;

a first optical waveguide connected to one or each of plural first output ports, which is or are selected from the output ports, and allowing a light exiting from the one or plural first output ports to propagate therethrough, the first optical waveguide having a refractive index changed in response to a trigger signal externally applied;

a second optical waveguide connected to one or each of plural second output ports, which is or are selected from the output ports, and allowing a light exiting from the one or plural second output ports to propagate therethrough; and trigger for supplying, to the first optical waveguide, the trigger signal for changing the refractive index of the first optical waveguide, and wherein the first multimode interferometer has a second input port other than the first input port, and wherein the trigger comprises:

a third multimode interferometer having a first input port to which a control light is applied, a first output port, and a second output port;

a third optical waveguide for introducing a light having exited from the second output port of the third multimode interferometer to the second input port of the first multimode interferometer; and a combining optical element for combining a light having exited from the first output port of the third multimode interferometer with the optical signal, and introducing a combined light to the first input port of the first multimode interferometer.

8. An optical demultiplexer according to claim 1, further comprising a transducer for converting the optical signal delivered from the drop signal output port of each of said drop devices into an electrical signal.

9. An optical demultiplexer according to claim 2, further comprising a transducer for converting the optical signal delivered from the drop signal output port of each of said drop devices into an electrical signal.

10. An optical demultiplexer according to claim 3, further comprising a transducer for converting the optical signal delivered from the drop signal output port of each of said drop devices into an electrical signal.

* * * * *